United States Patent [19]

Kalina

[11] 4,346,561
[45] Aug. 31, 1982

[54] GENERATION OF ENERGY BY MEANS OF A WORKING FLUID, AND REGENERATION OF A WORKING FLUID

[76] Inventor: Alexander I. Kalina, 12439 Millbanks, Houston, Tex. 77031

[21] Appl. No.: 143,524

[22] Filed: Apr. 24, 1980

Related U.S. Application Data

[63] Continuation of Ser. No. 92,268, Nov. 8, 1979, abandoned.

[51] Int. Cl.³ .............................................. F01K 25/10
[52] U.S. Cl. ......................................... 60/673; 55/70; 55/89; 55/93
[58] Field of Search ................... 60/641.6, 641.7, 649, 60/673; 55/70, 89, 93

[56] References Cited

U.S. PATENT DOCUMENTS

| 427,401 | 5/1890 | Campbell | 60/673 |
| 3,783,613 | 1/1974 | Billings et al. | 60/38 |
| 4,009,575 | 3/1977 | Hartman, Jr. | 60/673 |
| 4,037,415 | 7/1977 | Christopher | 60/673 |
| 4,101,297 | 7/1978 | Uda | 55/89 |
| 4,297,332 | 10/1981 | Tatani | 55/89 X |

FOREIGN PATENT DOCUMENTS

| 294882 | 9/1929 | United Kingdom . |
| 352492 | 7/1931 | United Kingdom . |
| 786011 | 11/1957 | United Kingdom . |
| 872874 | 7/1961 | United Kingdom . |
| 1085116 | 9/1967 | United Kingdom . |

*Primary Examiner*—Allen M. Ostrager
*Attorney, Agent, or Firm*—Arnold, White & Durkee

[57] ABSTRACT

A method of optimizing, within limits imposed by a heating medium from the surface of an ocean and a cooling medium from an ocean depth, the energy supply capability of a gaseous working fluid which is expanded from a charged high pressure level to a spent low pressure level to provide available energy, the method comprising expanding the gaseous working fluid to a spent low pressure level where the condensation temperature of the working fluid is below the minimum temperature of the cold water, and regenerating the spent working fluid by, in at least one regeneration stage, absorbing the working fluid being regenerated in an absorption stage by dissolving it in a solvent solution while cooling with the cold water, the solvent solution comprising a solvent having an initial working fluid concentration which is sufficient to provide a solution having a boiling point, after dissolving the working fluid being regenerated, which is above the minimum temperature of the cold water to permit effective absorption of the working fluid being regenerated, increasing the pressure and then evaporating the working fluid being regenerated by heating in an evaporation stage with the available hot water, feeding the evaporated working fluid and the solvent solution to a separator stage for separating the evaporated working fluid and the solvent solution, recovering the evaporated, separated working fluid, and recycling the balance of the solvent solution from the separator stage to constitute the solvent solution for the absorption stage; and an apparatus for carrying out the method.

32 Claims, 4 Drawing Figures

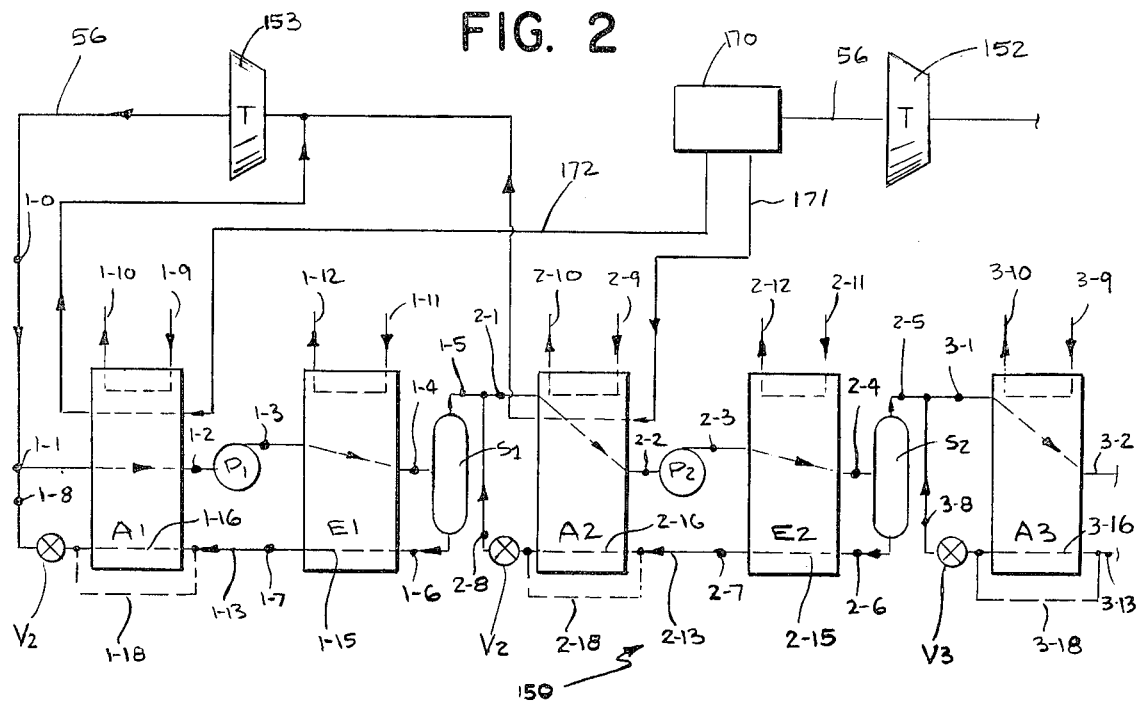
FIG. 2
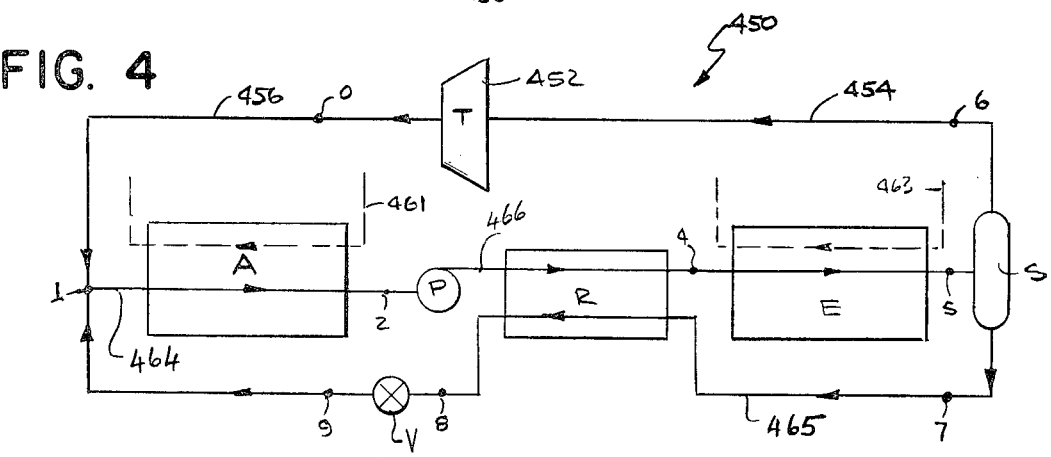
FIG. 4
FIG. 3

GENERATION OF ENERGY BY MEANS OF A WORKING FLUID, AND REGENERATION OF A WORKING FLUID

CROSS REFERENCE TO RELATED APPLICATION

This application is a continuation application of my copending application Ser. No. 092,268 filed Nov. 8, 1979 now abandoned.

This invention relates to the generation of energy by means of a working fluid, and to the regeneration of a working fluid. More particularly, this invention relates to a method of and to apparatus for generating energy by means of a working fluid and for regenerating such a working fluid.

In the generation of energy by expansion of a working fluid, the energy which can be produced by expansion of the working fluid is limited by the temperatures at which heating and cooling mediums can economically be provided for regeneration of the working fluid. The result is, therefore, that such a working fluid is expanded from a high pressure charged level to a low pressure spent level, with the high pressure charged level being governed by the maximum pressure at which the working fluid can be evaporated with the available heating medium, and with the spent low pressure level being governed by the minimum pressure at which the working fluid can be condensed with the available cooling medium.

In practice, therefore, expansion of the working fluid is controlled to provide a spent low pressure level at which the condensation temperature of the working fluid is greater than the temperature of the cooling medium, to permit condensation of the working fluid.

In addition, in practice, regeneration is based on condensation of working fluid in a condenser wherein the working fluid is arranged to flow in heat exchange relationship with an available cooling medium. Because of the desire to achieve maximum expansion of the working fluid, regeneration of working fluid is often effected where the temperature difference between the condensation temperature of the spent working fluid at the spent level and the temperature of the available cooling medium is marginal—often as low as 1° C. This of necessity imposes a requirement for a large condenser with an extensive heat exchange surface, and for a large supply of cooling medium, thereby substantially adding to the operating costs.

This is particularly significant where severe restraints are imposed by the temperatures of available heating and cooling mediums as in the case of ocean thermal energy conversion systems.

In accordance with one aspect of this invention, there is provided a method of generating energy, which comprises expanding a gaseous working fluid from a charged high pressure level to a spent low pressure level to release energy, and regenerating the spent working fluid by, in a plurality of successive regeneration stages:

(a) condensing the working fluid in an absorption stage by dissolving it in a solvent solution while cooling with a cooling medium, the solvent solution comprising a solvent having an initial working fluid concentration which is sufficient to provide a solvent solution boiling range suitable for absorption of the working fluid;

(b) increasing the pressure of the solvent solution containing the dissolved working fluid, and evaporating the working fluid being regenerated by heating in an evaporation stage;

(c) feeding the evaporated working fluid to a succeeding regeneration stage;

(d) recycling the balance of the solvent solution remaining after evaporation of the working fluid, to constitute the solvent solution for the absorption stage of that regeneration stage; and (e) withdrawing regenerated charged working fluid from a final regeneration stage for re-expansion to release energy;

The working fluid may be expanded to a spent low pressure level where the condensation temperature of the gaseous working fluid is below the minimum temperature of the cooling medium in the absorption stage.

In accordance with another aspect of the invention, there is provided a method of optimizing, within limits imposed by available sources of cooling and heating mediums, the energy supply capability of a gaseous working fluid which is expanded from a charged high pressure level to a spent low pressure level to provide available energy, the method comprising expanding the gaseous working fluid to a spent low pressure level where the condensation temperature of the working fluid is below the minimum temperature of the available cooling medium, and regenerating the spent working fluid by, in a plurality of successive incremental regeneration stages:

(a) condensing the working fluid being regenerated in an absorption stage by dissolving it in a solvent solution while cooling with the cooling medium, the solvent solution comprising a solvent having an initial working fluid concentration which is sufficient to provide a solvent solution boiling range suitable for absorption of the working fluid;

(b) increasing the pressure of the solvent solution containing the dissolved working fluid, and evaporating the working fluid being regenerated by heating in an evaporation stage with the available heating medium;

(c) feeding the evaporated working fluid to a succeeding regeneration stage for condensation;

(d) recycling the balance of the solvent solution remaining after evaporation of the working fluid being regenerated, to constitute the solvent solution for the absorption stage of that regeneration stage; and (e) withdrawing regenerated working fluid from a final regeneration stage.

Further in accordance with the invention, there is provided a method of optimizing, within limits imposed by available sources of cooling and heating mediums, the energy supply capability of a gaseous working fluid which is expanded from a charged high pressure level to a spent low pressure level to provide available energy, the method comprising expanding the gaseous working fluid to a spent low pressure level, and regenerating the spent working fluid by, in a plurality of successive regeneration stages, condensing the working fluid and then evaporating the working fluid at an increased pressure, the working fluid being condensed in each regeneration stage by absorbing or dissolving it in a solvent solution while cooling with the cooling medium, the solvent solution comprising a solvent having, in each stage, an initial working fluid concentration which is sufficient to provide a solvent solution boiling range suitable for absorption of the working fluid, and the working fluid being evaporated in each stage by increasing the pressure to a level where the working fluid being regenerated can be evaporated with the available heating medium, and then evaporating the working fluid.

The invention further extends to apparatus for generating energy, the apparatus comprising expansion means for expanding a gaseous working fluid from a charged high pressure level to a spent low pressure level to release energy, and a plurality of successive regeneration stages for regenerating such a spent working fluid, each regeneration stage comprising:

(a) an absorber for receiving both a spent working fluid and a solvent solution for dissolving or absorbing the spent working fluid, the absorber having circulation means for circulating a cooling medium through it to cool it;

(b) a pump for pumping a resultant solvent solution from the absorber to increase its pressure;

(c) an evaporator for receiving a resultant solvent solution from the pump, the evaporator having circulation means for circulating a heating medium through it to heat it to evaporate such a working fluid to be regenerated;

(d) a separator for separating such an evaporated working fluid being regenerated, from such a solvent solution;

(e) feed means to feed such an evaporated working fluid to the absorber of a succeeding regeneration stage;

(f) recycle means for recycling a solvent solution from the separator to the condenser;

and a feed conduit for feeding a regenerated working fluid from the separator of a final regeneration stage to the expansion means.

Since the solvent solution in each regeneration stage is recycled, the solvent solution constitutes a closed loop in that stage, and is separate from the solvent solution in each other regeneration stage. Furthermore, in each regeneration stage, the quantity of working fluid being regenerated is dissolved in the solvent solution of that stage, and the equivalent quantity of working fluid being regenerated is evaporated from the solvent solution in the evaporation stage of each regeneration stage.

It will be appreciated that the quantity of solvent solution, and the initial concentration of working fluid in the solvent solution in each regeneration stage will be separately adjusted as may be required for specific operating conditions, and as may be required for variations in the minimum temperature level of an available cooling medium.

The solvent of the solvent solution may be any suitable solvent which is a solvent for the working fluid, which has a boiling point above the maximum temperature which will be attained in any evaporation stage, and which will provide a solvent solution when working fluid is dissolved therein, which has a boiling point which decreases as the concentration of working fluid increases.

While the solvent solution is preferably a binary solution, it will be appreciated that it may be a solution of a plurality of liquids.

A number of working fluids which would be suitable, are known to those skilled in the art. Any of such working fluids may be employed in this invention.

In one embodiment of the invention, the working fluid and solvent may be in the form of hydrocarbons having appropriate boiling points. Thus, for example, the solvent may be in the form of butane or pentane while the working fluid may be in the form of propane. In an alternative example, the working fluid may be an appropriate freon compound, with the solvent being an appropriate solvent for that compound.

In a preferred embodiment of the invention, the working fluid is in the form of ammonia and the solvent is in the form of water. In this embodiment of the invention, at a pressure of one atmosphere the boiling point of water is 100° C. whereas the boiling point of pure ammonia is $-33°$ C. As the concentration of ammonia in water increases, the boiling point of the aqueous ammonia solution will decrease. From binary phase diagrams of water and ammonia solutions, the appropriate initial concentration of ammonia in the solvent solution for each regeneration stage, can readily be determined for this invention from the pressure and temperature which will prevail in each condensation stage.

In a preferred embodiment of the invention, the initial concentration of working fluid in the solvent solution in each regeneration stage, and the proportion of solvent solution to working fluid to be regenerated will be selected so that after complete absorption of the working fluid being regenerated in the absorption stage of that regeneration stage, the solvent solution will have a boiling point marginally above the minimum temperature attained in that absorption stage during use.

In practice, therefore, the minimum quantity of solvent solution will be employed which will satisfy this requirement thereby reducing cooling medium requirements to the minimum, and thereby further reducing heating medium requirements to the minimum.

It will be appreciated that since the pressure is increased between the absorption stage and evaporation stage of each regeneration stage, there will be a stepwise or incremental increase in pressure between each preceeding regeneration stage and each succeeding regeneration stage. It follows, therefore, that the initial concentration of working fluid in the solvent solution for each successive regeneration stage will be correspondingly higher to provide a boiling range for the solvent solution in each stage which is suitable for dissolving or absorbing the working fluid at the pressure prevailing in that stage.

In a preferred embodiment of the invention, the pressure is increased between the absorption and evaporation stages of each regeneration stage, to the maximum pressure at which the working fluid being regenerated can be evaporated effectively in the evaporation stage by the, or by a heating medium, available for heating the evaporation stage.

The pressure is, therefore, preferably increased in each regeneration stage to the maximum level where the solvent solution in each evaporation stage will, after evaporation of the working fluid in that stage, have a boiling point marginally below the maximum temperature attainable in that evaporation stage.

By appropriate control of the pressure, evaporation of the required quantity of working fluid being regenerated can be readily effected in each evaporation stage. Control valve means may, however, be provided to control the quantity of evaporated working fluid which is fed from each regeneration stage to each succeeding regeneration stage. Thus, if a greater quantity of working fluid than that required for regeneration has been evaporated in an evaporator stage, only the required quantity will pass to the succeeding regeneration stage. The balance will be recycled with the solvent solution.

The method of this invention may preferably include the step of, in each regeneration stage, feeding the solvent solution and evaporated working fluid from the evaporation stage to a separation stage for separating the working fluid being regenerated.

The separator stage may be provided by a separator of any conventional suitable type known to those skilled in the art.

The solvent solution which is recycled to the absorption stage in each regeneration stage, is conveniently expanded to reduce its pressure to a pressure corresponding with or approaching that of the pressure of the working fluid being regenerated in that absorption stage.

In a preferred embodiment of the invention, in each regeneration stage, the solvent solution which is recycled, is recycled in heat exchange relationship with the evaporation stage to thereby reduce the heating medium requirements for the evaporation stage.

The solvent solution which is recycled in each regeneration stage, may be recycled at least partially in heat exchange relationship with the absorption stage.

Where the recycled solvent solution is recycled in heat exchange relationship with an absorption stage, the cooling medium requirement will decrease because the quantity of heat to be removed will remain constant, but the capacity of the absorption stage will have to be increased. Conversely, if the recycled solvent solution is not recycled in heat exchange relationship with the absorption stage, the capacity of the absorption stage will decrease while the requirement of cooling medium will increase.

In practice, therefore, depending upon the source and availability of the cooling medium, on the basis of economic considerations, the reduced cost of supplying lesser quantities of cooling medium can be balanced against the capital costs of increasing the capacity of the absorption stages to determine whether the recycled solvent solution should be recycled in heat exchange relationship, or at least partially in heat exchange relationship with the absorption stages, or not at all.

In an embodiment of the invention, all of the absorption stages of the regeneration stages may be carried out separately in a single composite absorption stage which is cooled by means of cooling medium from a common source. Furthermore, all of the evaporation stages may be carried out separately in a single composite evaporation stage which is heated by means of a heating medium from a common source.

The apparatus of this invention may, therefore, include a single composite absorption unit and a single composite evaporation unit, with all the absorbers of the various regeneration stages being incorporated in the absorption unit, and all the evaporators of the various regeneration stages being incorporated in the evaporated unit.

While this invention may have various applications, and while various types of cooling and heating means known to those skilled in the art, may be employed, this invention can have particular application in regard to the utilization of readily and economically available cooling and heating mediums for the generation of energy.

The invention can, therefore, have specific application where low temperature differential heating and cooling mediums are employed.

A preferred application of the invention would, therefore, be in the field of thermal energy conversion using cool water withdrawn from a sufficient depth from a body of water as the cooling medium, and using, as heating medium, surface water from a body of water, solar heating, surface water heated additionally by solar heating means, or water or heating fluid in the form of waste heat fluids from industrial plants.

A preferred application of the invention would, therefore, be in the field of ocean thermal energy conversion [OTEC] where ocean surface water is used as the heating medium and ocean water withdrawn from a sufficient depth from an ocean is used as the cooling medium, thereby resulting in a low temperature differential between the heating and cooling mediums.

Normally, ocean water would be withdrawn from a depth of about 200 feet to provide the most economical cooling medium at the lowest temperature. The temperature does not tend to decrease significantly beyond a depth of about 200 feet.

The invention further extends to a method of increasing the pressure of a gaseous working fluid from an initial low pressure level to a high pressure level utilizing an available heating medium and utilizing an available cooling medium, which comprises incrementally increasing the pressure of the working fluid by, in a plurality of successive incremental regeneration stages:

(a) absorbing the working fluid being regenerated in an absorption stage by dissolving it in a solvent solution while cooling with such an available cooling medium; the solvent solution comprising a solvent having an initial working fluid concentration which is sufficient to provide a solvent solution boiling range suitable for absorption of the working fluid;

(b) increasing the pressure of the solvent solution containing the dissolved working fluid, and evaporating the working fluid being regenerated in an evaporation stage by heating with such an available heating medium;

(c) feeding the evaporated working fluid which is at an increased pressure level, to a succeeding regeneration stage for absorption;

(d) recycling the balance of the solvent solution remaining after evaporation of the working fluid being regenerated, to constitute the solvent solution for the absorption stage of that regeneration stage; and (e) withdrawing regenerated working fluid from a final regeneration stage.

In accordance with a further aspect of the invention, there is provided a method of generating energy, which comprises expanding a gaseous working fluid from a charged high pressure level to a spent low pressure level to release energy, and regenerating the spent working fluid by, in at least one regeneration stage:

(a) condensing the working fluid in an absorption stage by dissolving it in a solvent solution while cooling with a cooling medium, the solvent solution comprising a solvent having an initial working fluid concentration which is sufficient to provide a solvent solution boiling range suitable for absorption of the working fluid;

(b) increasing the pressure of the solvent solution containing the dissolved working fluid and evaporating the working fluid being regenerated by heating in an evaporation stage;

(c) withdrawing the evaporated working fluid for re-expansion to release energy; and (d) recycling the balance of the solvent solution remaining after evaporation of the working fluid, to constitute the solvent solution for the absorption stage of that regeneration stage.

In accordance with a further aspect of the invention there is provided a method of optimizing, within limits imposed by available sources of cooling and heating mediums, the energy supply capability of a gaseous working fluid which is expanded from a charged high pressure level to a spent low pressure level to provide available energy, the method comprising expanding the gaseous working fluid to a spent low pressure level, and regenerating the spent working fluid by, in at least one regeneration stage:

(a) condensing the working fluid being regenerated in an absorption stage by dissolving it in a solvent solution while cooling with the cooling medium, the solvent solution comprising a solvent having an initial working fluid concentration which is sufficient to provide a solvent solution boiling range suitable for absorption of the working fluid;

(b) increasing the pressure of the solvent solution containing the dissolved working fluid, and evaporating the working fluid being regenerated by heating in an evaporation stage with the available heating medium;

(c) withdrawing the evaporated working fluid to constitute a charged working fluid; and (d) recycling the balance of the solvent solution remaining after evaporation of the working fluid being regenerated, to constitute the solvent solution for the absorption stage of that regeneration stage.

The invention further extends to a method of optimizing, within limits imposed by available sources of cooling and heating mediums, the energy supply capability of a gaseous working fluid which is expanded from a charged high pressure level to a spent low pressure level to provide available energy, the method comprising expanding the gaseous working fluid to a spent low pressure level where the condensation temperature of the working fluid is below the minimum temperature of the available cooling medium, and regenerating the spent working fluid by absorbing the working fluid and then evaporating the working fluid at an increased pressure, the working fluid being absorbed in an absorption stage by dissolving it in a solvent solution while cooling with the cooling medium, the solvent solution comprising a solvent having an initial working fluid concentration which is sufficient to provide a solvent solution boiling range suitable for absorption of the working fluid, and the working fluid being evaporated in an evaporator stage by increasing the pressure and then evaporating the working fluid being regenerated with the available heating medium.

The invention further extends to a method of increasing the pressure of a gaseous working fluid from an initial low pressure level to a high pressure level utilizing an available heating medium and utilizing an available cooling medium having a temperature which need not be below the condensation temperature of the low pressure working fluid, which comprises:

(a) condensing the working fluid being regenerated in an absorption stage by dissolving it in a solvent solution while cooling with such an available cooling medium; the solvent solution comprising a solvent having an initial working fluid concentration which is sufficient to provide a solvent solution boiling range suitable for absorption of the working fluid;

(b) increasing the pressure of the solvent solution containing the dissolved working fluid, and evaporating the working fluid being regenerated in an evaporation stage by heating with such an available heating medium;

(c) recovering the evaporated working fluid which is at the increased pressure level; and (d) recycling the balance of the solvent solution remaining after evaporation of the working fluid being regenerated, to constitute the solvent solution for the absorption stage.

The expansion of the working fluid from a charged high pressure level to a spent low pressure level to release energy may be effected by any suitable conventional means known to those skilled in the art, and the energy so released may be stored or utilized in accordance with any of a number of conventional methods known to those skilled in the art.

In a preferred embodiment of the invention, the working fluid may be expanded to drive a turbine of conventional type.

In an embodiment of the invention, where the mass ratio between the solvent solution being recycled through an absorption stage and the working fluid being regenerated is sufficient, the pressure of the solvent solution leaving the evaporation stage may be utilized to increase the pressure of the working fluid being regenerated which is introduced into the absorption stage with the recycled solvent solution.

In this embodiment of the invention, instead of expanding the solvent solution which is recycled to reduce its pressure to a pressure corresponding with or approaching that of the pressure of the working fluid being regenerated in an absorption stage, the solvent solution may be injected into the absorption stage in such a manner as to entrain the working fluid and draw the working fluid into the absorption stage.

Various injection systems are known to those skilled in the art which could be used for this purpose. As an example, an injection system such as an injection nozzle having a restricted zone to create a zone of low pressure may be used. With such an injection nozzle, the working fluid will be introduced into the proximity of the restricted zone so that the reduced pressure created will permit the working fluid to be introduced into the absorption stage.

It will be appreciated that, depending upon relative flow rates and pressures, it may still be necessary to control the pressure of the recycled solvent solution by expanding it to provide an appropriate pressure.

By utilizing the pressure, or at least part of the pressure, of the solvent solution which is recycled, this will contribute to an increase in pressure in the absorption stage. This can provide the advantage of improving absorption in the absorption stage, or can be utilized to permit expansion of the working fluid to an even lower spent level. In this event, the initial increase in pressure provided by the solvent solution may be utilized to increase the pressure in the absorption stage, to a level where absorption can be effectively achieved in accordance with this invention.

Applicant believes that this application of the pressure of the solvent solution will tend to be valuable in the first stage, and probably the first and second stages of a multi-stage regeneration system while, in a single stage system or a system employing only two stages it will tend to be less valuable. This will primarily be due to the fact that the mass ratio between the recycled solvent solution and the working fluid will not be sufficient.

Preferred embodiments of the invention are now described by way of example with reference to the accompany drawings.

In the drawings:

FIG. 2 shows a fragmentary schematic representation of the method and apparatus of FIG. 1 incorporating a modification to the expansion stage;

FIG. 3 shows a fragmentary schematic representation of a further embodiment of the invention in which injection means is utilized to inject the working fluid being regenerated;

FIG. 4 shows a schematic representation of a further embodiment of the method and apparatus of this invention.

Figure 1:
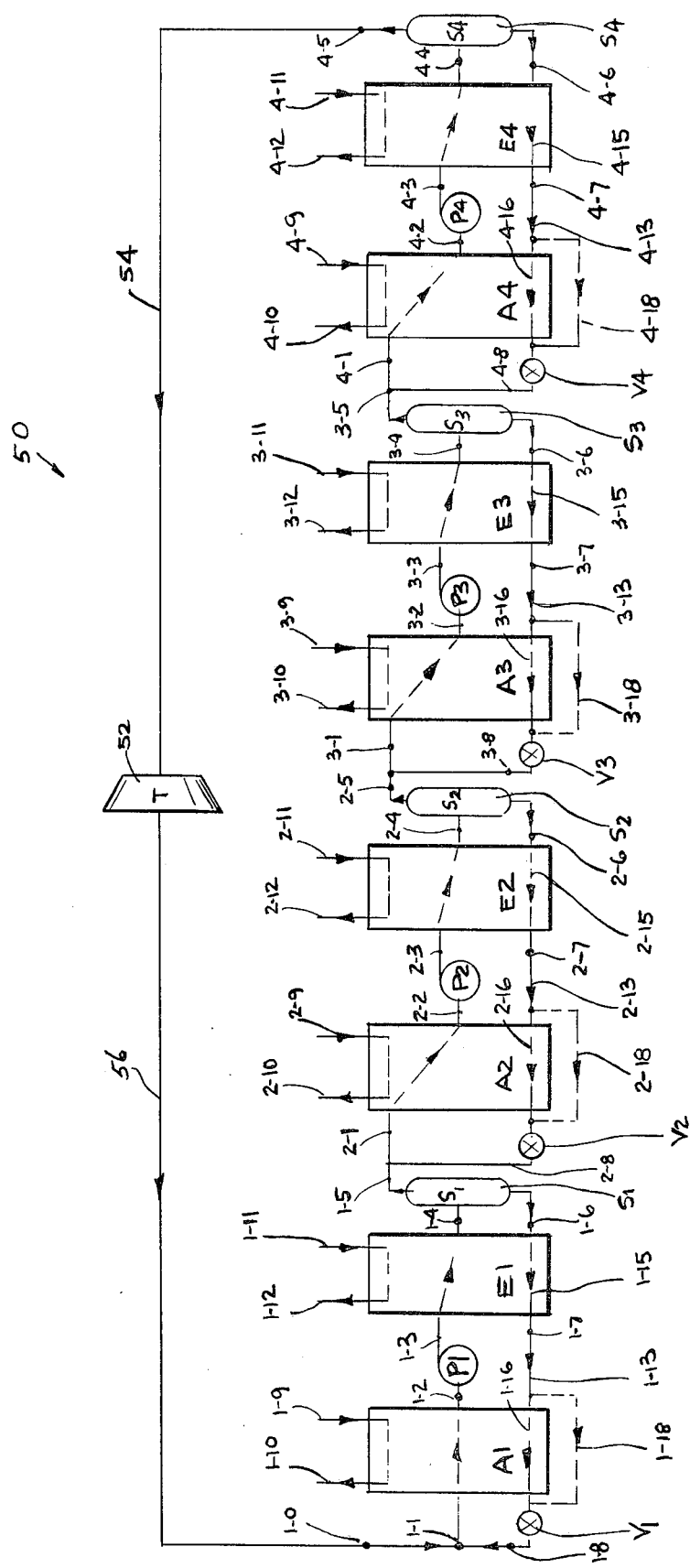
FIG. 1 shows a schematic representation of one embodiment of the method and apparatus of this invention.

With reference to FIG. 1 of the drawings, numeral 50 refers generally to apparatus for use in generating energy by the expansion of a gaseous working fluid from a charged high pressure level to a spent low pressure level to release energy, and for regenerating the spent working fluid.

The apparatus 50 includes expansion means in the form of a turbine 52 in which a gaseous working fluid is expanded from a charged high pressure level to a spent low pressure level to released energy to drive the turbine 52. The gaseous working fluid at the high pressure level is fed to the turbine 52 along charged line 54 and is discharged from the turbine 52 along spent line 56.

The apparatus 50 further includes regeneration means for regenerating the spent gaseous fluid. The regeneration means comprises four successive incremental regeneration stages.

For ease of reference the components of each regeneration stage have been identified by a letter followed by a suffix in arabic numerals indicating the particular regeneration stage. In addition, the flow lines for each regeneration stage have been identified by reference numerals having a prefix corresponding to that of the particular regeneration stage.

The first regeneration stage comprises an absorber A1 for condensing the gaseous working fluid by dissolving it in a solvent solution, a pump P1 for pumping the solvent solution containing the dissolved working fluid to increase the pressure, evaporator E1 for evaporating the working fluid, and a separator S1 for separating the evaporated working fluid from the solvent solution.

The first regeneration stage includes an influent line 1-1 into which the spent gaseous working fluid from the spent line 56 and solvent solution from a solvent solution recycle line 1-13 are fed into the first stage and through the absorber A1.

The resultant solvent solution from the absorber A1 is fed along line 1-2 to the inlet of the pump P1. The solution is discharged from the pump P1 at an increased pressure along line 1-3 and through the evaporator E1. The solvent solution and evaporated working fluid are fed from the evaporator E1 along line 1-4 to the separator S1. The separated evaporated working fluid is fed from the separator S1 along line 1-5 to the influent line 2-1 of the second stage. The solvent solution from the separator S1 is recycled along solvent solution recycle line 1-13 to the influent line 1-1.

The second, third and fourth regeneration stages correspond exactly with the first regeneration stage except that the evaporated, separated working fluid from the separator S4 is withdrawn along line 4-5 and fed into the charged line 54 to repeat the cycle.

In the preferred embodiment of the invention, the gaseous working fluid is ammonia, whereas the solvent is water. In addition, in the preferred embodiment of the invention, the apparatus 50 is an apparatus for use in producing energy by ocean thermal energy conversion.

The apparatus 50 is, therefore, conveniently installed on the seashore or on a floating platform. In addition, the apparatus 50 includes pump means [not shown] for pumping surface water from the surface of an ocean to the evaporators of the apparatus to constitute the heating medium for the apparatus, and includes pump means [not shown] for pumping cold water from a sufficient depth of such an ocean for constituting the cooling medium for cooling the absorbers of the apparatus 50.

Thus, the absorber A1 includes circulation means having an inlet 1-9 and an outlet 1-10 for circulating deep ocean water through the absorber A1. Similarly, the evaporator E1 includes an inlet 1-11 and an outlet 1-12 for circulating ocean surface water through the evaporator for heating the evaporator E1.

Further, in each regeneration stage, the recycle line 1-13, 2-13, 3-13 and 4-13 has an evaporator heat exchange line 1-15, 2-15, 3-15 and 4-15, respectively, passing in heat exchange relationship through the evaporator E.

In addition, in each of the regeneration stages, the solvent solution recycle line -13 may have a condenser heat exchange line 1-16, 2-16, 3-16 and 4-16, respectively, extending in heat exchange relationship through the absorber A or, alternatively, may completely bypass the absorber A as indicated by chain-dotted lines 1-18, 2-18, 3-18 and 4-18.

Where the recycled solvent solution passes in heat exchange relationship through the absorber of each regeneration stage, it will assist in cooling the absorber and will thus reduce the quantity of cooling water required to effect the required cooling in that absorber since the quantity of heat to be transferred will remain constant. It will, however, necessitate an increase in the absorber capacity and thus, in the absorber size.

In practice, therefore, the capital cost of an increase in absorber size can be balanced against the cost of the additional quantity of cooling medium to decide, on the basis of pure economics, as to whether the recycle line should pass through the absorbers, should completely bypass the absorbers, or should pass partially through the absorbers.

In the preferred embodiment of the invention, the recycle lines will bypass the absorbers.

In the preferred embodiment of the invention, the gaseous working fluid is ammonia, whereas the solvent solution is a solution of ammonia in water.

The use of the apparatus 50, and thus the process of this invention, is now described with reference to a preferred ocean thermal energy conversion system typically employing, as heating medium, surface water at a temperature of 27° C., and employing as cooling medium, deep ocean water [typically at a depth of not less than about 200 feet] having a temperature of about 4° C.

Since the boiling point of pure ammonia is −33° C. at a pressure of one atmosphere, and since the minimum temperature of the cold water cooling medium is 4° C., it would normally not be possible to regenerate ammonia at a pressure of one atmosphere by using such a cooling medium. In other words, regeneration would only be possible if the ammonia working fluid were at a pressure where the boiling point of ammonia is above 4° C.

In other words, regeneration of the gaseous working fluid would only be possible if the working fluid is expanded across the turbine 52 to a pressure at which it is capable of regeneration with the available cooling medium. This imposes a direct and severe limitation on the energy which can be generated since the maximum pressure to which the ammonia working fluid can be regenerated is also limited by the evaporation capacity of the hot water heating medium at 27° C.

In practice, utilizing surface water at a temperature of about 27° C., evaporation of ammonia in the final evaporator E4 can only be achieved in an effective manner at a maximum pressure of about nine atmospheres.

It will be appreciated, therefore, that if the working fluid can be expanded from a charged level of nine atmospheres to a spent level pressure of one atmosphere, as opposed to a spent level pressure of say only four atmospheres, the quantity of energy released will be increased substantially.

In the preferred process as illustrated in FIG. 1, the gaseous ammonia working fluid is indeed allowed to expand across the turbine 52 from a pressure of about nine atmospheres to a pressure of about one atmosphere.

A specific quantity of gaseous working fluid to be regenerated, at a spent pressure level of one atmosphere is, therefore fed to the first stage along influent line 1-1.

This quantity of gaseous working fluid is condensed in the absorber A1 by dissolving it in a solvent solution which is fed along solvent solution recycle line 1-13 into the influent line 1-1 at the same pressure of one atmosphere.

In the preferred embodiment of the invention, the solvent solutions will not be passed in heat exchange relationship through the absorbers. Thus, the spent gaseous ammonia, which may contain about 10% by weight of liquid ammonia, will be at a temperature of about −33° C., whereas the corresponding solvent solution will be at a temperature of about 8° C.

The solvent solution comprises water having an initial ammonia concentration which is sufficient to provide a binary solution which at the pressure of one atmosphere, has a boiling point within the temperature range which will prevail in the absorber A1. Further, the proportion of solvent solution to the quantity of working fluid to be regenerated is such that after the solvent solution has dissolved the quantity of working fluid to be regenerated in the absorber A1, the resultant binary solution will have a concentration which will provide, at the pressure of one atmosphere, a boiling point marginally above the minimum temperature of the cooling medium. The boiling point of the solvent solution will thus be in the region of about 6° C. where the minimum temperature of the cold water is about 4° C.

In this way it will be insured that the total quantity of working fluid to be regenerated will dissolve in the solvent solution, and that the minimum quantity of solvent solution to dissolve that quantity of gaseous ammonia will be employed thereby reducing the cold water requirements and the capacity of the absorber A1 to the practical minimum.

The solvent solution containing the dissolved working fluid being regenerated, will leave the absorber A1 at a temperature of about 6° C. and at a pressure of one atmosphere, and is pumped by the pump P1 to the evaporator E1.

The pump P1 is controlled to increase the pressure of the solvent solution to the maximum pressure at which the dissolved ammonia working fluid can be effectively evaporated in the evaporator E1 by means of the surface water heating medium at a maximum temperature of 27° C.

Preferably, the pressure increase is controlled so that after evaporation of the quantity of working fluid being regenerated, the solvent solution in the evaporator E1 will have a boiling point marginally below 27° C., such as about 25° C.

This pressure can readily be determined from a binary water/ammonia phase diagram in relation to the prevailing ammonia concentration and temperature range in the evaporator E1.

It will naturally be appreciated that the initial concentration of ammonia in water for the solvent solution, as also the required quantity of solvent solution; which is fed to the absorber A1, can also readily be determined from such a phase diagram on the basis of the known pressure and temperature range.

The evaporated working fluid and solvent solution are fed along line 1-4 to the separator S1, where they are allowed to separate.

From the separator S1, the solvent solution, at a temperature of about 25° C. will be recycled along the solvent solution recycle line 1-13 to constitute the solvent solution for the first stage. The separated, evaporated ammonia working fluid at about 25° C. is fed from the separator S1 to the second regeneration stage along influent line 2-1. As in the case of the first regeneration stage, the quantity of working fluid being regenerated, is mixed with a solvent solution recycled from a separator S2 of the second regeneration stage along the solvent solution recycle line 2-13 for dissolving the working fluid in the absorber A2.

Since the pressure in the absorber A2 will be greater than the pressure in the absorber A1, it follows that the initial concetration of ammonia in the solvent solution for the second stage will be correspondingly higher to insure that an appropriate boiling point is again provided for effectively dissolving or absorbing the working fluid being regenerated in the absorber A2.

It will be appreciated that the solvent solution which is recycled from the separator S to the absorber A in each stage leaves the separator S at a higher pressure than the pressure of the influent working fluid. Each solvent solution recycle line 1-13, 2-13, 3-13 and 4-13, therefore, includes a pressure-reducing valve V1, V2, V3 and V4, respectively, for reducing the pressure of the recycled solvent solution to the same pressure as that of the influent working fluid being regenerated.

For each successive regeneration stage, therefore, the initial concentration of ammonia in the solvent solution will increase step-wise in correspondence with the step-wise increase in pressure provided by the pump means in each stage.

It will be appreciated that the apparatus will include an appropriate number of regeneration stages until the quantity of working fluid being regenerated, has been regenerated to the appropriate charged high pressure level in a final regeneration stage such as the fourth regeneration stage shown in the drawing. It will further be appreciated that the spent pressure level to which the working fluid is expanded, will likewise determine the number of regeneration stages required. Thus if the working fluid is expanded to only say 3 atmospheres, only two or three regeneration stages may be required.

In the embodiment illustrated in the drawing, the pump means P4 will increase the pressure of the solvent solution to about nine atmospheres thereby yielding a charged regenerated working fluid at a pressure of about nine atmospheres which is withdrawn from the separator S4 and fed along the charged line 54 to the turbine 52.

It will be appreciated that in the preferred embodiment of the invention, the process will be carried out as a continuous process in which a constant quantity of working fluid by unit time is continuously being expanded across the turbine 52 and is then continuously being regenerated in the regeneration means.

To further illustrate the use of the invention in the preferred embodiment as illustrated in FIG. 1, typical parameters of the process are now indicated with reference to specific theoretical calculations performed on the basis of 1 kilogram of gaseous ammonia working fluid, and on the basis of deep ocean water at a minimum temperature of 4° C. as cooling medium, and surface ocean water at a maximum temperature of 27° C. as heating medium.

These parameters as calculated are set out in Tables I, II, III and IV below for the first, second, third and fourth regeneration stages, respectively.

In each table, the particular point at which the parameter has been calculated, is indicated by the appropriate reference numeral in the drawing. These points are listed in the first column of each table.

The columns in the tables are as follows:

(a) First column—reference numerals (RN);
(b) Second column—temperature (t) in °C.;
(c) Third column—pressure (p) in atmospheres;
(d) Fourth column—ratio by weight of total ammonia (dissolved and undissolved) to water plus total ammonia (RATIO);
(e) Fifth column—weight (w) in kilograms; and
(f) Sixth column—Enthalpy (E) in kcal/g.

TABLE I

| RN | t | p | RATIO | w | E |
|---|---|---|---|---|---|
| 1-0 | −32.0 | 1.0 | .9920 | 1.0000 | 354.45 |
| 1-1 | +9.0 | 1.0 | .4266 | 22.2556 | −642 |
| 1-2 | +6.0 | 1.0 | .4266 | 22.2556 | −20.0 |
| 1-3 | +6 | 1.8 | .4266 | 22.2556 | −20.0 |
| 1-4 | +25.0 | 1.8 | .4266 | 22.2556 | 17.9730 |
| 1-5 | +25.0 | 1.8 | .9920 | 1.0000 | 400.0 |
| 1-6 | +25.0 | 1.8 | .4000 | 21.2556 | 0.0 |
| 1-7 | +8.0 | 1.8 | .4000 | 21.2556 | −23.4 |
| 1-8 | +8.0 | 1.0 | .4000 | 21.2556 | −23.4 |

TABLE II

| RN | t | p | RATIO | w | E |
|---|---|---|---|---|---|
| 2-1 | +10.0 | 1.8 | .5160 | 17.2457 | 9.4125 |
| 2-2 | +6.0 | 1.8 | .5160 | 17.2457 | −10.80 |
| 2-3 | +6.0 | 3.0 | .5160 | 17.2457 | −10.80 |
| 2-4 | +25.0 | 3.0 | .5160 | 17.2457 | 28.6905 |
| 2-5 | +25.0 | 3.0 | .9920 | 1.0000 | 403.0 |
| 2-6 | +25.0 | 3.0 | .4867 | 16.2457 | 5.65 |
| 2-7 | +8.0 | 3.0 | .4867 | 16.2457 | −14.63 |
| 2-8 | +8.0 | 1.8 | .4867 | 16.2457 | −14.63 |

TABLE III

| RN | t | p | RATIO | w | E |
|---|---|---|---|---|---|
| 3-1 | +10.0 | 3.0 | .6490 | 8.0000 | 48.625 |
| 3-2 | +6.0 | 3.0 | .6490 | 8.0000 | 10.00 |
| 3-3 | +6.0 | 5.0 | .6490 | 8.0000 | 10.00 |
| 3-4 | +25.0 | 5.0 | .6490 | 8.0000 | 68.688 |
| 3-5 | +25.0 | 5.0 | .9920 | 1.0000 | 409.5 |
| 3-6 | +25.0 | 5.0 | .6000 | 7.0000 | 20.00 |
| 3-7 | +8.0 | 5.0 | .6000 | 7.0000 | −2.00 |
| 3-8 | +8.0 | 3.0 | .6000 | 7.0000 | −2.00 |

TABLE IV

| RN | t | p | RATIO | w | E |
|---|---|---|---|---|---|
| 4-1 | +10.0 | 5.0 | 0.9000 | 5.4231 | 124.45 |
| 4-2 | +6.0 | 5.0 | 0.9000 | 5.4231 | 80.0 |
| 4-3 | +6.0 | 9.0 | .9000 | 5.4231 | 80.0 |
| 4-4 | +25.0 | 9.0 | .9000 | 5.4321 | 139.59 |
| 4-5 | +25.0 | 9.0 | .9920 | 1.0000 | 412.0 |
| 4-6 | +25.0 | 9.0 | .8792 | 4.4231 | 78.0 |
| 4-7 | +8.0 | 9.0 | .8792 | 4.4231 | 60.0 |
| 4-8 | +8.0 | 9.0 | .8792 | 4.4231 | 60.0 |
| 4-9 | +8.0 | 5.0 | .8792 | 4.4231 | 60.0 |

From the above theoretical calculations, the total heat supplied to the four evaporator stages amounted to 1258.35 kcals, while the total heat removed from the four absorption stages mounted to 1200.8 kcals.

The difference of 57.55 is the work put in per kilogram of working fluid regenerated and thus the theoretical amount of work which is available.

The energy required to operate the pumps was calculated to be 2.08 kcals/kg of working fluid regenerated.

The theoretical amount of work available is therefore 55.47 kcal/kg of working fluid.

If it is assumed that the efficiency of the turbine is 85%, the theoretical thermal efficiency will be 4.408%.

The theoretical thermal efficiency of an ideal Carnot cycle system operating with a cooling medium at a constant temperature of 4° C. and with a heating medium at a constant temperature of 27° C., would be 7.04%. However, considering that the temperature of the heating and cooling mediums must change in such a process, the efficiency of the theoretical ideal thermodynamical cycle will be only about 4.9%.

Therefore, the ratio of the efficiency of a system in accordance with this invention on the basis of the theoretical calculations, would be:

(a) 62.55% in relation to an ideal Carnot cycle system;
(b) about 82% in relation to an ideal thermodynamical cycle under corresponding conditions.

It is an advantage of the embodiment of the invention as illustrated with reference to the drawing, that an effective system can be provided for generating energy by using the relatively low temperature differential between surface ocean water as heating medium and deep ocean water as cooling medium.

It is a further advantage of this embodiment that a system can be provided for regeneration of spent gaseous ammonia at a relatively low level of about one atmosphere or less.

It is a further advantage of the embodiment of the invention as illustrated, that because the regeneration range of the gaseous working fluid has been increased, the gaseous working fluid can be expanded from a high pressure level of about nine atmospheres, to a low pressure level of about one atmosphere or less. Thus, the quantity of energy available for release is substantially greater than would be the case if the working fluid were expanded from a pressure of about nine atmospheres to a pressure of only about four or five atmospheres.

The embodiment of the invention as illustrated in the drawing can provide a further advantage arising from the fact that the cold water requirements need only be sufficient to provide a final temperature in each absorber of about 6° C. The temperature of the cold water cooling medium can thus increase across each absorber as indicated in the above tables. Thus, the cooling medium requirements will be substantially less than would be the case if it were necessary to supply a sufficient quantity of cooling water at a sufficient rate to approach the Carnot cycle ideal where the cooling medium would remain at the constant minimum temperature. The same considerations apply to the heating medium, where the hot water is allowed to cool from about 27° C. to the temperature indicated in the above tables across each evaporator stage thereby again providing a substantially reduced heating water requirement over that required by the ideal Carnot cycle operation.

It will be appreciated that since, in each absorber, the cooling range for the solvent solution and working fluid is substantially the same, and the temperature range for the cooling medium is substantially the same, the absorbers of the four regeneration stages can conveniently be combined into a single composite absorber through which the lines 1-1, 2-1, 3-1 and 4-1 pass separately for cooling by means of a single circulating supply of cold water. In the same way, all the evaporators can be combined in a single composite evaporator heated by means of the circulating hot water from a single source.

It will further be appreciated that, theoretically, the quantity of solvent solution in each regeneration stage should remain constant, and that the initial concentration of ammonia in water to constitute the solvent solution, should also remain constant for constant minimum cooling water temperatures and constant maximum heating water temperatures.

In practice, however, the quantity of solvent solution will have to be adjusted during use to compensate for varying conditions and for losses. In addition, the concentration of ammonia in water in each regeneration stage, will have to be adjusted periodically in relation to seasonal variations in the minimum temperature of cold water and maximum temperature of hot water.

It will also be appreciated that where heating of the hot water can economically be achieved, such as by solar heating or the like, the effectiveness of the process of this invention can be improved. Such supplemental heating will, therefore, be employed under appropriate conditions if dictated by economic considerations.

With reference to FIG. 2 of the drawings, numeral 150 refers generally to an alternative embodiment of the method and apparatus of this invention to the embodiment illustrated in FIG. 1.

The apparatus 150 corresponds substantially with the apparatus 50 and corresponding parts are indicated by corresponding reference numerals.

In the apparatus 150, in place of the single turbine 52 of the apparatus 50, a two-stage turbine system is employed comprising a first turbine 152 and a second turbine 153.

The charged working fluid is partially expanded across the first turbine 152 into a heat exchange vessel 170.

From the heat exchange vessel 170 the partially expanded working fluid is led along separate conduits 171 and 172 through the absorber A2 and through the absorber A1 respectively in heat exchange relationship with the cooling water.

Thereafter the partially spent working fluid is further expanded across the second turbine 153 to its final spent level. It is then fed, as before, along the spent line 56 to the influent line 1-1.

Applicant believes that by utilizing a two-stage turbine system with heat exchange of the partially expanded working fluid, the effectiveness of the system can be improved particularly where the system includes a number of regeneration stages. Applicant believes that it will tend to be less significant where fewer stages are employed.

With reference to FIG. 3 of the drawings, the drawing shows, to an enlarged scale, the apparatus of FIG. 1 which has been adapted in the first and second regeneration stages for the pressure of the recycled solvent solution to be utilized in increasing the pressure of the influent spent working fluid into the absorption stage A1 and the absorption stage A2 respectively.

As indicated in FIG. 3, the absorption stage A1 incorporates an injection system for injecting the recycled solvent solution at a pressure substantially higher than the pressure of the spent working fluid into the absorber A1.

The injection system is in the form of an injection nozzle 180 having an intermediate restricted zone to generate a zone of low pressure.

The spent line 56 joins the nozzle 180 at the restricted zone and, as is known those skilled in the art, in an attitude where the reduced pressure generated at the restricted zone by the solvent solution being injected through the nozzle 180 into the absorber A1, will draw the spent working fluid into the nozzle 180 and thus into the absorber A1.

It will be appreciated that the effectiveness of this system will depend upon the mass ratio between the solvent solution being recycled and the working fluid being regenerated.

If the ratio is to low, it will not be possible to introduce the total quantity of working fluid being regenerated by means of the flow of the solvent solution being recycled.

In practice therefore, depending upon conditions, it may be necessary to partially reduce the pressure of the solvent solution being recycled before entry into the nozzle 180, or it may be necessary to introduce some of the working fluid being regenerated through the nozzle 180, and the remainder directly into the absorber A1.

While the absorber A2 has not been illustrated in FIG. 3, it will be appreciated that the working fluid being regenerated in the second regeneration stage will be introduced into the absorber A2 by means of an injection system corresponding to that of the absorber A1.

The embodiment of the invention as illustrated in FIG. 3 of the drawings, can provide the advantage that the pressure of the solvent solution being recycled in the first and second stages respectively can be at least partially utilized to introduce the working fluid being regenerated, and to increase the pressure in the first and second absorbers A1 and A2.

This affect can be utilized to improve the effectiveness of absorption in the first and second absorbers A1 and A2. Alternatively, or in addition, this feature can be utilized to permit expansion of the charged working fluid to a yet lower pressure across the turbine 52, with reliance being placed on the pressure contribution of the solvent solution being recycled to raise the pressure in the absorber A1 to a level where effective absorption of the working fluid being regenerated can be effected. Similarly, if employed in relation to the second regeneration stage, the same considerations will apply where the working fluid introduced into the absorber A2 can be at a lower pressure, and reliance is placed on the pressure of the solvent solution being recycled into the absorber A2, to increase the pressure to a level for effective absorption in the absorber A2.

Applicant believes that the injection system can be advantageous in the apparatus 50 particularly in the first and second stages, but would tend to have lesser value in subsequent stages.

With reference to FIG. 4 of the drawings, reference numeral 450 refers generally to yet a further alternative embodiment of the method and apparatus of this invention.

The system 450 as illustrated in FIG. 4, is designed for use where the charged working fluid is expanded to a relatively higher level than the level described with reference to FIGS. 1 to 3, but regeneration of the spent working fluid is effected in accordance with this invention to provide an economical system with high efficiency.

The apparatus 450 includes a turbine 452, and absorber A, a pump P, a regenerator R, an evaporator E and a separator S.

The spent working fluid expanded across the turbine 452 is fed along spent line 456 to influent line 464. Solvent solution which is recycled from the separator S along solvent solution recycle line 465 is fed through a pressure reducing valve V to reduce the pressure of the solvent solution to that of the spent working fluid, and then into the absorber A through the influent line 464.

As described with reference to FIG. 1, cooling medium in the form of cold deep ocean water is circulated in heat exchange relationship through the absorber A by means of conduit 461, while heating surface water is circulated through evaporator E in heat exchange relationship therewith, along conduit 463.

The spent working fluid is absorbed by the solvent solution in the absorber A whereafter the solvent solution containing the absorbed working fluid has its pressure increased by the pump P.

The solvent solution containing the absorbed working fluid is fed from the pump P along line 466 through the regenerator R and then to the evaporator E for evaporation of the dissolved working fluid being regenerated.

The solvent solution being recycled along the line 465, is passed in heat exchange relationship with the solvent solution passes through the regenerator R to effect heat exchange.

From the evaporator E, the evaporated fluid being regenerated and the solvent solution passes to the separator S for separation, whereafter the separated charged working fluid is fed along charged line 454 to the turbine 452.

To illustrate this embodiment of the invention, typical parameters of the process of the system of FIG. 4, are now indicated with reference to specific theoretical calculations performed on the basis of 1 kilogram of gaseous ammonia working fluid, and on the basis of deep ocean water at a minimum temperature of 4° C. as cooling medium, and surface ocean water at a maximum temperature of 27° C. as heating medium.

These parameters as calculated are set out in Table V below. The particular point at which the parameter has been calculated, has been indicated by the appropriate reference numeral in FIG. 4. These points are listed in the first column of Table V.

TABLE V

| POINTS | TEM-PER-ATURE °C. | PRES-SURE atm. | CONCEN-TRATION Kg NH4/Kg Solution | MASS Kg | EN-THALPY K Cal/Kg |
|---|---|---|---|---|---|
| 0 | +25 | 5.5 | 0.9920 | 1.00 | 388.0 |
| 1 | +12 | 5.5 | 0.9368 | 1.75 | 248.78 |
| 2 | +8 | 5.5 | 0.9368 | 1.75 | 75.00 |
| 3 | +8 | 9.0 | 0.9368 | 1.75 | 75.00 |
| 4 | +12 | 9.0 | 0.9368 | 1.75 | 80.64 |
| 5 | +25 | 9.0 | 0.9368 | 1.75 | 265.45 |
| 6 | +25 | 9.0 | 0.9920 | 1.00 | 407.30 |
| 7 | +25 | 9.0 | 0.8632 | 0.75 | 76.32 |
| 8 | +13 | 9.0 | 0.8632 | 0.75 | 63.16 |
| 9 | +10 | 9.5 | 0.8632 | 0.75 | 63.16 |

It will be noted from Table V that the working fluid is expanded from a charged level of 9 atmospheres to a spent level of 5.5 atmospheres. It will further be noted that the spent working fluid and solvent solution enter the absorber A at a temperature of 12° C., and that the solvent solution containing the absorbed working fluid being regenerated, leaves the absorber A at a temperature of about 8° C.

By using an absorber A for absorbing the spent ammonia working fluid, and by having an appropriate initial concentration of ammonia in water for the solvent solution being recycled, absorption of the ammonia working fluid can commence in the absorber A at a temperature of 12° C. or slightly higher, and complete absorption will have occurred by the time the temperature has been reduced to about 8° C. by the cooling medium at 4° C.

There is therefore a significant temperature difference between the temperature of the cooling medium and the minimum temperatures required for complete absorption of the working fluid being regenerated.

In contrast with a system employing a conventional condensation stage for the condensation of a working fluid such as ammonia, condensation of gaseous ammonia at 5.5 atmospheres would only commence at a temperature of about 5° C. resulting in a marginal difference of 1° C. between the temperature of condensation and the temperature of the available cooling medium, which is at 4° C.

Thus, before condensation can occur in a condensation stage, the temperature of the working fluid would have to be reduced to about 5° C. by the cooling medium at 4° C. It will be appreciated that because of the marginal temperature difference, the requirements of cooling water will be substantial and a substantial heat transfer surface will be required.

In contrast therewith, by utilizing an absorber in accordance with this invention, while both the working fluid being regenerated and the solvent solution being recycled will have to be cooled, because absorption of working fluid can commence at a temperature substantially above the temperature of the cooling medium, and can be completed at a temperature substantially above the temperature of the cooling medium, the amount of cooling water required can be reduced substantially and/or the heat transfer surface requirement can be reduced substantially.

In practice, on the basis of economics, the cooling water requirements, the heat transfer surface area, and the temperature difference between the temperature of the cooling water and the temperature required for complete absorption of the spent working fluid, can be balanced to achieve the most economical system in the light of the operating parameters and capital costs.

Because the solvent solution containing the working fluid being regenerated would leave the absorber A at a temperature higher than the temperature of a condensed working fluid leaving a condenser, evaporation in the evaporator E will be facilitated. By additionally circulating the solvent solution being recycled and the solvent solution containing the absorbed working fluid in heat exchange relationship through the regenerator R, both absorption in the absorber A and evaporation in the evaporator E will be improved.

The system 450 therefore provides the advantage of an increased enthalpy drop across the turbine 452 and provides a system of increased efficiency and economy.

To illustrate the advantages of the system in accordance with this invention, calculations have been performed to compare the system illustrated in FIG. 4 with a conventional OTEC system utilizing a conventional Rankine cycle under the same operating parameters imposed by the temperatures of the heating and cooling mediums. The parameters for the Rankine cycle system were obtained from the publication entitled "OTEC Pilot Plan Heat Engine" by D. Richards and L. L. Perini, John Hopkins University, OTC 3592, 1979.

This comparison is set out in Table VI below.

TABLE VI

COMPARISON OF OFF-DESIGN OPERATING CHARACTERISTICS OF OTEC PLANTS WITH AMMONIA CLOSED RANKINE CYCLE-[1] AND WATER-AMMONIA ABSORBTION CYCLE OF FIG. 4 IN ACCORDANCE WITH THIS INVENTION-[2]

|  |  | RANKINE-[1] | FIG. 4 CYCLE-[2] |
|---|---|---|---|
| Warm water temperature | °C. | +27.89 | +27.89 |
| Cold water temperature | °C. | +4.00 | +4.00 |
| Pressure of evaporation | atm. | 8.8516 | 9.00 |
| Pressure of condensation | atm. | 6.2784 | 5.5 |
| Inlet turbine temperature | °C. | +20.389 | +25.00 |
| Outlet turbine temperature | °C. | +10.00 | +7.00 |
| Expansion ratio |  | 1.41 | 1.636 |
| Enthalpy drop through turbine | $\frac{kcal}{kg}$ | 8.524 | 16.984 |
| Turbine efficiency |  | 0.88 | 0.88 |
| Turbine-generator power | MW | 13.76 | 12.452 |
| Sea water pumps power | MW | 2.856 | 1.832 |
| Ammonia pump power | MW | 0.408 | 0.124 |
| Aux power | MW | 0.0151 | 0.0151 |
| Net electrical power | MW | 10.345 | 10.345 |
| Evaporator water flow | kg/h | 158.76 × 10⁶ | 107.87 × 10⁶ |
| Condenser water flow | kg/h | 158.76 × 10⁶ | 95.86 × 10⁶ |
| Ammonia flow through turbine | kg/h | 1.388 × 10⁶ | 0.6304 × 10⁶ |
| Sea water temperature drop |  |  |  |
| evaporator | °C. | 2.580 | 1.89 |
| condenser/absorber | °C. | 2.505 | 2.0 |
| Heat flow through |  |  |  |
| evaporator | kcal/h | 409.583 × 10⁶ | 203.880 × 10⁶ |
| condenser/absorber | kcal/h | 397.752 × 10⁶ | 191.715 × 10⁶ |
| regenerator | kcal/h | 0.0 | 6.222 × 10⁶ |
| Average temperature difference |  |  |  |
| in evaporator | °C. | 6.12 | 4.056 |
| in condenser/absorber | °C. | 4.635 | 4.933 |
| in regenerator | °C. | — | 9.87 |
| Heat |  |  |  |

TABLE VI-continued

COMPARISON OF OFF-DESIGN OPERATING CHARACTERISTICS OF OTEC PLANTS WITH AMMONIA CLOSED RANKINE CYCLE-[1] AND WATER-AMMONIA ABSORBTION CYCLE OF FIG. 4 IN ACCORDANCE WITH THIS INVENTION-[2]

|  |  | RANKINE-[1] | FIG. 4 CYCLE-[2] |
|---|---|---|---|
| exchangers surface area |  |  |  |
| evaporator | m² | 78,272.5 | 59,136.79 |
| condenser/absorber | m² | 100,953.65 | 45,722.09 |
| regenerator | m² | 0.0 | 990.87 |
| Total |  | 179,681.15 | 105,849.75 |
| Net thermal efficiency | % | 2.1716 | 4.3627 |

Thermal efficiency ratio between [2] & [1] = 2.009
Cold water flow decrese in [2] % = 39.62
Heat exchangers area decrase in [2] % = 41.09

The significant advantages of the system of FIG. 4 in relation to the conventional Rankine cycle system are clearly apparent from Table VI above. It is clear that the system in accordance with this invention can provide significant imporvements in efficiency and economy. This is particularly significant in OTEC systems and related systems where the severe restraints imposed by the temperatures of the available heating and cooling mediums have heretofore presented a serious barrier to commercial utilization of OTEC systems.

What is claimed is:

1. A method of generating energy, which comprises expanding a gaseous working fluid from a charged high pressure level to a spent low pressure level to release energy, and regenerating the spent working fluid by, in a plurality of successive regeneration stages:
   (a) condensing the working fluid in an absorption stage by dissolving it in a solvent solution while cooling with a cooling medium, the solvent solution comprising a solvent having an initial working fluid concentration which is sufficient to provide a solvent solution boiling range suitable for absorption of the working fluid;
   (b) increasing the pressure of the solvent solution containing the dissolved working fluid and evaporating the working fluid being regenerated by heating in an evaporation stage;
   (c) feeding the evaporated working fluid to a succeeding regeneration stage;
   (d) recycling the balance of the solvent solution remaining after evaporation of the working fluid, to constitute the solvent solution for the absorption stage of that regeneration stage; and
   (e) withdrawing regenerated charged working fluid from a final regeneration stage for re-expansion to release energy.

2. A method according to claim 1, in which, in each regeneration stage, the initial concentration of working fluid in the solvent solution is sufficient, and the proportion of solvent solution to working fluid to be regenerated is such that after absorption of the working fluid being regenerated in the absorption stage, the solvent solution will have a boiling point marginally above the minimum temperature attained in that absorption stage.

3. A method according to claim 1 or claim 2, in which the pressure is increased between the absorption and evaporation stages of each regeneration stage, to the maximum pressure at which the working fluid being regenerated can be evaporated from the solvent solution in the evaporation stage by a heating medium available for heating the evaporation stage.

4. A method according to claim 1, in which, in each regeneration stage, the solvent solution and evaporated working fluid are fed from the evaporation stage to a separation stage for separating the working fluid being regenerated.

5. A method according to claim 1, in which, in each regeneration stage, the solvent solution which is recycled to the absorption stage is expanded to reduce its pressure to the pressure of the working fluid being regenerated in that absorption stage.

6. A method according to claim 1, in which, in each regeneration stage, the solvent solution which is recycled is recycled in heat exchange relationship with the evaporation stage.

7. A method according to claim 6, in which, in each regeneration stage, the solvent solution which is recycled is recycled at least partially in heat exchange relationship with the absorption stage.

8. A method according to claim 1, in which all of the absorption stages of the successive regeneration stages are carried out separately in a single composite absorption stage which is cooled by means of the cooling medium.

9. A method according to claim 1, in which all of the evaporation stages of the successive regeneration stages are carried out separately in a single composite evaporation stage.

10. A method according to any claim 1, in which the cooling medium is provided by cool water withdrawn from a sufficient depth from a body of water.

11. A method according to claim 10, in which the cooling medium is provided by cool ocean water withdrawn from a sufficient depth from an ocean.

12. A method according to claim 1, in which each evaporation stage is heated by means of surface water withdrawn from a body of water.

13. A method according to claim 1, in which the working fluid being regenerated is introduced into each absorption stage at a pressure where the condensation temperature of the working fluid is below the minimum temperature of the cooling medium.

14. A method of optimizing, within limits imposed by available sources of cooling and heating mediums, the energy supply capability of a gaseous working fluid which is expanded from a charged high pressure level to a spent low pressure level to provide available energy, the method comprising expanding the gaseous working fluid to a spent low pressure level where the condensation temperature of the working fluid is below the minimum temperature of the available cooling medium, and regenerating the spent working fluid by, in a plurality of successive incremental regeneration stages:

(a) condensing the working fluid being regenerated in an absorption stage by dissolving it in a solvent solution while cooling with the cooling medium, the solvent solution comprising a solvent having an initial working fluid concentration which is sufficient to provide a solvent solution boiling range suitable for absorption of the working fluid;

(b) increasing the pressure of the solvent solution containing the dissolved working fluid, and evaporating the working fluid being regenerated by heating in an evaporation stage with the available heating medium;

(c) feeding the evaporated working fluid to a succeeding regeneration stage for condensation;

(d) recycling the balance of the solvent solution remaining after evaporation of the working fluid being regenerated, to constitute the solvent solution for the absorption stage of that regeneration stage; and (e) withdrawing regenerated working fluid from a final regeneration stage.

15. A method according to claim 14, in which, in each regeneration stage, the initial concentration of working fluid in the solvent solution is sufficient, and the proportion of solvent solution to working fluid to be regenerated is such that after absorption of the working fluid being regenerated in the absorption stage the solvent solution will have a boiling point marginally above the minimum temperature attained in that absorption stage.

16. A method according to claim 14, in which the pressure is increased between the absorption and evaporation stages of each regeneration stage, to the maximum pressure at which the working fluid being regenerated can be evaporated from the solvent solution in the evaporation stage by the available heating medium.

17. A method according to claim 14, in which, in each regeneration stage, the solvent solution which is recycled to the absorption stage is expanded to reduce its pressure to the pressure of the working fluid being regenerated in that absorption stage.

18. A method according to claim 14, in which, in each regeneration stage, the solvent solution which is recycled is recycled in heat exchange relationship with the evaporation stage.

19. A method according to claim 18, in which, in each regeneration stage, the solvent solution which is recycled is recycled at least partially in heat exchange relationship with the absorption stage.

20. A method according to claim 14, in which the cooling medium is provided by cool water withdrawn from a sufficient depth from a body of water.

21. A method according to claim 20, in which the cooling medium is provided by cool ocean water withdrawn from a sufficient depth from an ocean.

22. A method according to claim 20, in which each evaporation stage is heated by means of surface water withdrawn from a body of water.

23. A method according to claim 14, in which, in at least the first absorption stage, the solvent solution being recycled, is injected into that absorption stage to create a low pressure zone for drawing working fluid being regenerated, into that absorption stage.

24. A method of optimizing, within limits imposed by available sources of cooling and heating mediums, the energy supply capability of a gaseous working fluid which is expanded from a charged high pressure level to a spent low pressure level to provide available energy, the method comprising expanding the gaseous working fluid to a spent low pressure level where the condensation temperature of the working fluid is below the minimum temperature of the available cooling medium, and regenerating the spent working fluid by, in a plurality of successive regeneration stages, absorbing the working fluid and then evaporating the working fluid at an increased pressure, the working fluid being absorbed in each regeneration stage by dissolving it in a solvent solution while cooling with the cooling medium, the solvent solution comprising a solvent having, in each stage, an initial working fluid concentration which is sufficient to provide a solvent solution boiling range suitable for absorption of the working fluid, and the working fluid being evaporated in each stage by increasing the pressure and then evaporating the working fluid being regenerated with the available heating medium.

25. A method of increasing the pressure of a gaseous working fluid from an initial low pressure level to a high pressure level utilizing an available heating medium and utilizing an available cooling medium, which comprises incrementally increasing the pressure of the working fluid by, in a plurality of successive regeneration stages:
   (a) condensing the working fluid being regenerated in an absorption stage by dissolving it in a solvent solution while cooling with such an available cooling medium; the solvent solution comprising a solvent having an initial working fluid concentration which is sufficient to provide a solvent solution boiling range suitable for absorption of the working fluid;
   (b) increasing the pressure of the solvent solution containing the dissolved working fluid, and evaporating the working fluid being regenerated in an evaporation stage by heating with such an available heating medium;
   (c) feeding the evaporated working fluid which is at an increased pressure level, to a succeeding regeneration stage for absorption;
   (d) recycling the balance of the solvent solution remaining after evaporation of the working fluid being regenerated, to constitute the solvent solution for the absorption stage of that regeneration stage; and
   (e) withdrawing regenerated working fluid from a final regeneration stage.

26. Apparatus for generating energy, the apparatus comprising expansion means for expanding a gaseous working fluid from a charged high pressure level to a spent low pressure level to release energy, and a plurality of successive regeneration stages for regenerating such a spent working fluid, each regeneration stage comprising:
   (a) an absorber for receiving both a spent working fluid and a solvent solution for dissolving the spent working fluid, the absorber having circulation means for circulating a cooling medium through it to cool it;
   (b) a pump for pumping a resultant solvent solution from the absorber to increase its pressure;
   (c) an evaporator for receiving a resultant solvent solution from the pump, the evaporator having circulation means for circulating a heating medium through it to heat it to evaporate such a working fluid to be regenerated;
   (d) a separator for separating such an evaporated working fluid being regenerated, from such a solvent solution;
   (e) feed means to feed such an evaporated working fluid to the absorber of a succeeding regeneration stage;
   (f) recycle means for recycling a solvent solution from the separator to the absorber; and
   (g) a feed conduit for feeding a regenerated working fluid from the separator of a final regeneration stage to the expansion means.

27. Apparatus according to claim 26, in which each absorber circulation means includes pump means for pumping a cooling medium in the form of deep ocean water, from a sufficient ocean depth.

28. Apparatus according to claim 26, in which each evaporator circulation means includes pump means for pumping a heating medium in the form of surface ocean water from an ocean surface to the evaporator.

29. Apparatus according to claim 26, in which the recycle means of each regeneration stage passes in heat exchange relationship through the evaporator of that stage.

30. Apparatus according to claim 29, in which the recycle means of each regeneration stage passes at least partly in heat exchange relationship through the absorber of that stage.

31. Apparatus according to claim 26, in which the recycle means of each regeneration stage includes a pressure reducing valve for reducing the pressure of a recycled solvent solution to that of the pressure of a working fluid to be regenerated in the absorber of that stage.

32. Apparatus according to claim 26, which is mounted on a floating platform for floating on an ocean.

* * * * *